United States Patent
Pardo et al.

(10) Patent No.: US 11,580,036 B1
(45) Date of Patent: Feb. 14, 2023

(54) PROCESSOR WITH CONDITIONAL-FENCE COMMANDS EXCLUDING DESIGNATED MEMORY REGIONS

(71) Applicant: MELLANOX TECHNOLOGIES, LTD., Yokneam (IL)

(72) Inventors: Ilan Pardo, Ramat-Hasharon (IL); Shahaf Shuler, Kibbutz Lohamei Hagetaot (IL); George Elias, Tel Aviv (IL); Nizan Atias, Shani Livna (IL); Adi Maymon, Omer (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/385,962

(22) Filed: Jul. 27, 2021

(51) Int. Cl.
*G06F 12/14* (2006.01)
*G06F 9/30* (2018.01)
*G06F 12/02* (2006.01)

(52) U.S. Cl.
CPC ...... *G06F 12/1441* (2013.01); *G06F 9/30043* (2013.01); *G06F 12/0238* (2013.01); *G06F 12/1458* (2013.01); *G06F 2212/7201* (2013.01)

(58) Field of Classification Search
CPC ............ G06F 9/30043; G06F 12/0238; G06F 12/1441; G06F 12/1458; G06F 2212/7201
USPC ....................................................... 711/163
See application file for complete search history.

(56) References Cited

U.S. PATENT DOCUMENTS

| 6,708,269 | B1 | 3/2004 | Tiruvallur et al. | |
|---|---|---|---|---|
| 2002/0169933 | A1* | 11/2002 | Bilardi | G11C 7/1084 711/111 |
| 2006/0136355 | A1* | 6/2006 | Sikchi | G06F 40/174 |
| 2011/0145835 | A1* | 6/2011 | Rodrigues | G06F 9/544 711/170 |
| 2019/0227844 | A1 | 7/2019 | Horii et al. | |

OTHER PUBLICATIONS

McKenney, "Memory Barriers: A Hardware View for Software Hackers," Linux Technology Center, IBM Beaverton, pp. 1-28, Jul. 23, 2010.
Oracle, "Handling Memory Ordering in Multithreaded Applications with Oracle, Solaris Studio 12, Update 2, Part 1: Compiler Barriers", White Paper, pp. 1-10, Sep. 2010.
Oracle, "Handling Memory Ordering in Multithreaded Applications with Oracle, Solaris Studio 12, Update 2, Part 2: Memory Barriers and Memory Fences", White Paper, pp. 1-8, Sep. 2010.
Radhika et al., "Consistency Models in Distributed Shared Memory Systems," International Journal of Computer Science and Mobile Computing (IJCSMC), vol. 3, issue 9, pp. 196-201, Sep. 2014.

* cited by examiner

*Primary Examiner* — Edward J Dudek, Jr.
*Assistant Examiner* — Sidney Li
(74) *Attorney, Agent, or Firm* — Kligler & Associates Patent Attorneys Ltd

(57) ABSTRACT

An apparatus includes a processor, configured to designate a memory region in a memory, and to issue (i) memory-access commands for accessing the memory and (ii) a conditional-fence command associated with the designated memory region. Memory-Access Control Circuitry (MACC) is configured, in response to identifying the conditional-fence command, to allow execution of the memory-access commands that access addresses within the designated memory region, and to defer the execution of the memory-access commands that access addresses outside the designated memory region, until completion of all the memory-access commands that were issued before the conditional-fence command.

18 Claims, 6 Drawing Sheets ing the addresses specified in the memory-access commands to the designated address range.

In one embodiment, the conditional-fence command is restricted to load commands, and the MACC is configured to defer only the load commands that were issued before the conditional-fence command. Alternatively, the conditional-fence command is restricted to store commands, and the MACC is configured to defer only store commands that were issued before the conditional-fence command.

There is also provided, in accordance with an embodiment of the invention, a method, which includes receiving (i) memory-access commands for accessing a memory and (ii) a conditional-fence command associated with a designated memory region in the memory. In response to identifying the conditional-fence command, execution of the memory-access commands that access addresses within the designated memory region are allowed, and the execution of the memory-access commands that access addresses outside the designated memory region are deferred until completion of all the memory-access commands that were issued before the conditional-fence command.

The present invention will be more fully understood from the following detailed description of the embodiments thereof, taken together with the drawings in which:

US 11,580,036 B1

PROCESSOR WITH CONDITIONAL-FENCE COMMANDS EXCLUDING DESIGNATED MEMORY REGIONS

FIELD OF THE INVENTION

The present invention relates generally to computer systems, and particularly to methods and systems for fencing between memory access cycles in computer systems.

BACKGROUND OF THE INVENTION

A memory fence, also known as a memory barrier, is a type of fence instruction that causes a central processing unit (CPU) or compiler to enforce an ordering constraint on memory operations issued before and after the fence instruction.

In "Memory Barriers: A Hardware View for Software Hackers", Paul E. McKenney, Linux Technology Center, IBM Beaverton (Jul. 23, 2010) the author presents the principle and benefit of barrier instructions, and then goes on to describe barrier mechanism in several popular Central Processing Units (CPUs).

In "Handling Memory Ordering in Multithreaded Applications with Oracle Solaris Studio 12, Update 2 Parts 1, 2: Compiler Barriers" (an Oracle White Paper, September 2010), the authors discuss, in Part-1, how compiler barriers can be used to stop the compiler from generating code that is incorrect due to reordered memory accesses; and, in Part 2, how memory barriers or memory fences can be used to ensure that the processor does not reorder memory operations.

SUMMARY OF THE INVENTION

An embodiment of the present invention provides apparatus, including a processor, which is configured to designate a memory region in a memory, and to issue (i) memory-access commands for accessing the memory and (ii) a conditional-fence command associated with the designated memory region. Memory-Access Control Circuitry (MACC) is configured, in response to identifying the conditional-fence command, to allow execution of the memory-access commands that access addresses within the designated memory region, and to defer the execution of the memory-access commands that access addresses outside the designated memory region, until completion of all the memory-access commands that were issued before the conditional-fence command.

In one embodiment, the processor is configured to run one or more threads, and to designate the memory region for private intra-thread storage. Additionally or alternatively, the processor is one of multiple processors that share the memory, and the processor is configured to designate the memory region for private intra-processor storage.

In a disclosed embodiment, the processor is configured to issue the memory-access commands in terms of logical addresses, to define an address mapping that translates the logical addresses into physical addresses, and to insert into the address mapping indicators that identify the addresses in the designated memory region, and the MACC is configured to allow or defer the execution of the memory-access commands based on the indications.

Additionally or alternatively, the processor is configured to designate the memory region by specifying a designated address range, and the MACC is configured to allow or defer the execution of the memory-access commands by compar-

DETAILED DESCRIPTION OF EMBODIMENTS

Overview

Figure 1:
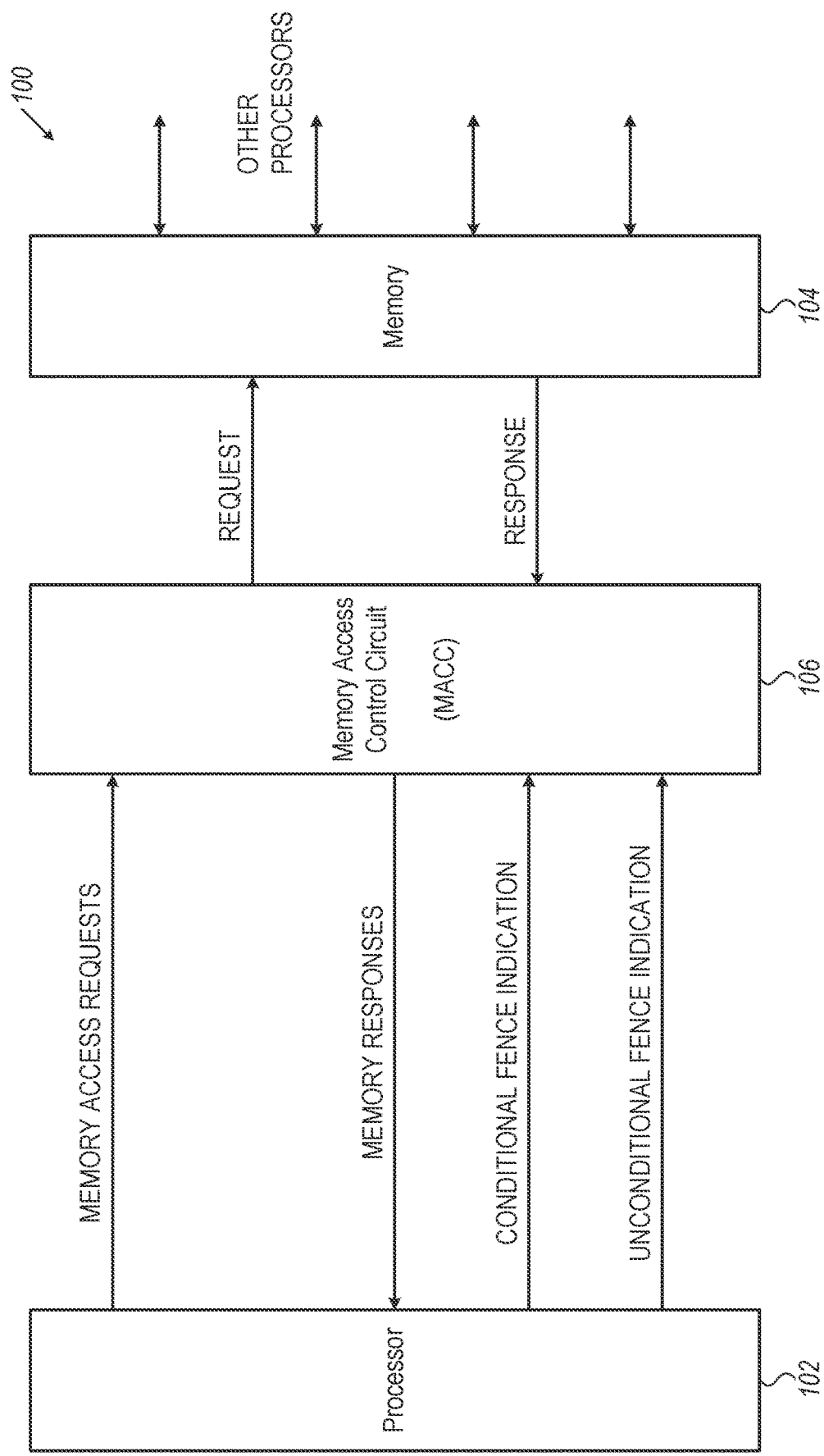
FIG. 1 is a block diagram that schematically describes a Processing System 100, in accordance with an embodiment of the present invention.

Although other definitions are sometimes used, we will refer hereinbelow to multiple processors running concurrently, multiple processes running concurrently on the same processor, and multiple threads running concurrently, as multi-processing systems.

In multi-processing systems, while the order of the memory accesses in some system busses adheres to Total-Store-Order (TSO) discipline, the order of the memory accesses of some common microprocessor cores is weaker ("relaxed"), allowing out-of-order execution of memory accesses. Strictly ordered execution is typically safer, but Relaxed-order execution may be faster, as processors can sometimes continue execution without waiting for memory cycles to complete. In "Consistency Models in Distributed Shared Memory Systems," International Journal of Computer Science and Mobile Computing (IJCSMC), Vol. 3, Issue 9, September 2014, pages 196-201, Radhika et al. describe various consistency models of a distributed memory in a multiprocessor environment.

In Relaxed-order execution, however, it may be necessary to force ordered execution of interdependent events. For example, when a first processor writes data that a second processor should read, and raises a flag when the data is ready, it is imperative that writing the flag and writing the data will be executed in-order. Typically, forcing ordered execution may be done by issuing a Fence instruction (sometimes called Barrier instruction). When a processor encounters a fence command, the processor will complete all memory access that correspond to instructions preceding the fence instruction before proceeding to execute the post-fence instructions. Thus, the fence instruction can be used to force ordered execution when needed.

Sometimes, issuing a fence instruction unnecessarily slows software execution—while interdependent memory accesses must be executed in order, there may be other memory accessing instruction in the code that follows the fence instruction, which are not dependent on pre-fence instructions; for example, the contents of the stack in a computer program is typically local, and does not change by other processes.

Embodiments according to the present invention that are disclosed herein provide for apparatuses and methods with conditional fence instructions. In embodiments, the processor comprises a Memory Access Control Circuit (MACC), which is configured to facilitate conditional fencing. In an embodiment, a processor may indicate to the MACC exception areas in the memory, which may be accessed after a conditional fence instruction, even if not all the memory accesses prior to the conditional fence have been completed.

In some embodiments the processor designates an exception area in logical address space, and a Memory Management Unit of the processor indicates that the accessed physical area is part of an exception area. In other embodiments, the exception areas are designated in physical memory—the processor sets start and end pointers for each such exception area, and the MACC checks whether the address of a memory access is within the exception areas, and, therefore, could be accessed prior to the completion of the pre-fence memory accesses.

In some embodiments, the processor runs one or more software threads, and an exception area is a "private" memory region designated for intra-thread storage. Since a given private memory region is only accessed by a single respective thread, such an area can be safely excluded from fencing. Other examples of exception areas are also discussed.

System Description

The embodiments disclosed herein refer to multi-processing systems in which a plurality of processes share a common memory. In some embodiments the multi-processing system comprises one or more central processing units (CPUs), one or more Graphic Processing Units (GPUs) and/or other processing units or combination of various types of processing units. In other embodiment, the multi-processing system may comprise one or more processors that run multiple concurrent threads or processes, and in yet other embodiments the processing system may comprise a combination of processors running single and/or multi-threads in single and/or multiple processes.

FIG. 1 is a block diagram that schematically describes a Processing System 100, in accordance with an embodiment of the present invention. Processing System 100 comprises a processor 102 that is configured to run software programs, a Memory 104 that is configured to store code and data, and a Memory Access Control Circuit (MACC) 106 that is configured to control accesses to memory 104 by processor 102. Processing System 100 may comprise other processors (not shown in the figure) that access memory 104.

The processor sends memory access requests to the MACC, which, responsively, accesses memory 104 and then sends a response back to the processor. To force ordered execution, the software program that processor 102 executes may comprise unconditional fence instructions. When the processor, while executing a software program, encounters an unconditional fence instruction, the processor sends a corresponding indication to the MACC. Responsive to a non-conditional fence indication, the MACC will refrain from executing further memory access requests from the processor until all memory requests that were issued prior to the unconditional fence indication are completed.

According to the example embodiment illustrated in FIG. 1, the Processor may also send to the MACC conditional fence indications. Responsive to a conditional fence indication, the MACC will, again, refrain from executing memory access requests from the processor until all memory requests (not marked as an exception) that were issued prior to the conditional fence indication are completed. However, the MACC will execute memory accesses that are directed to memory areas marked as exception areas with no delay, irrespective to the completion of the pre-fence memory requests.

As would be appreciated, the configuration of processing system 100, illustrated in FIG. 1 and described above, is an example configuration that is cited by way of example. Other suitable configurations may be used in alternative embodiments. For example, in some embodiments, MACC 106 or parts thereof may be embedded in Processor 102. In other embodiments, memory 104 is a Dynamic Random-Access Memory (DRAM), and MACC 106 is embedded in a DRAM controller (not shown).

Designation of Exception Memory Areas

Figure 2:
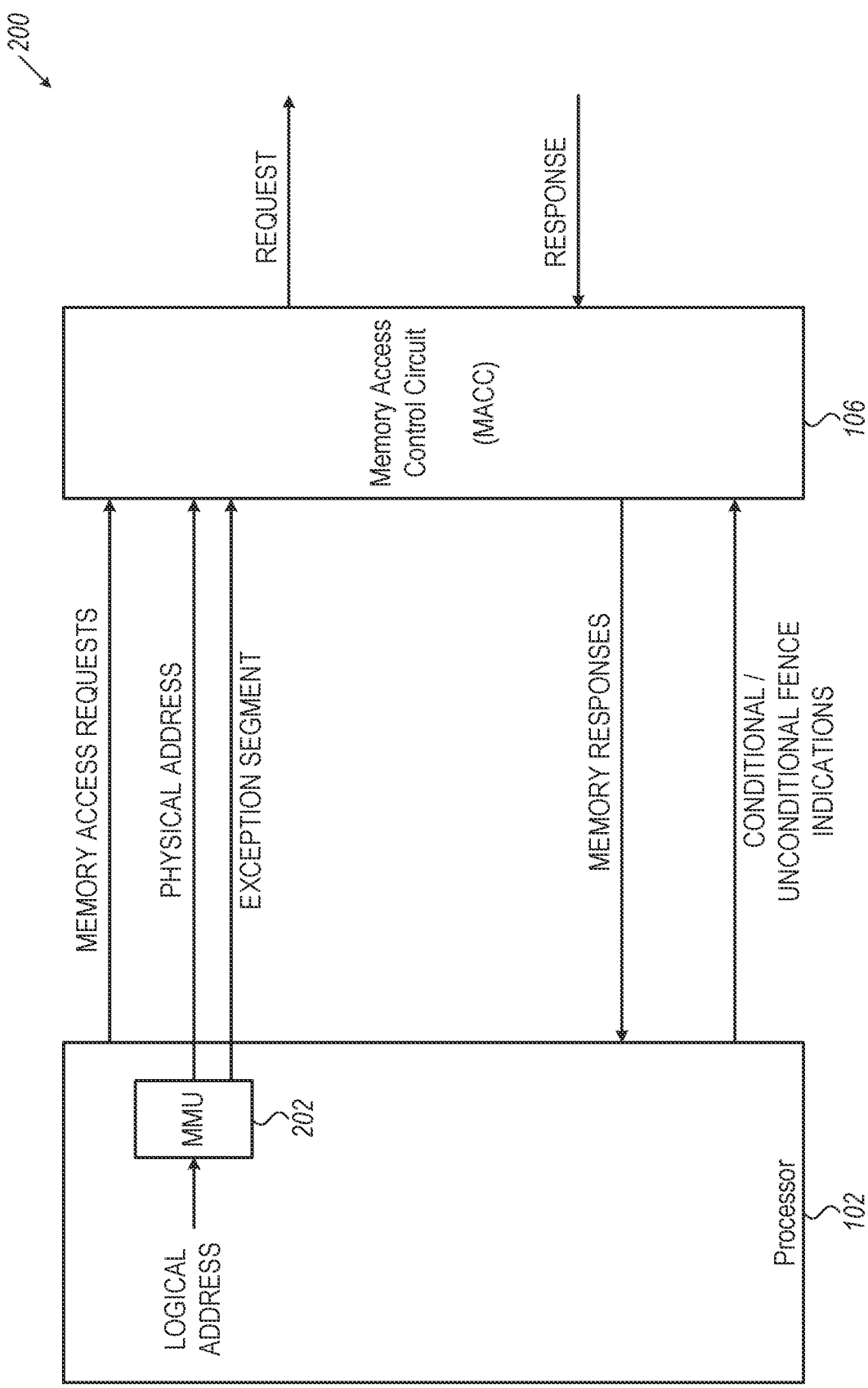
FIG. 2 is a block diagram that schematically illustrates conditional fence in a processing system wherein the exception memory areas are defined in the logical address space, in accordance with an embodiment of the present invention.

In embodiments according to the present invention, various techniques to indicate exception areas in the memory may be used. In some embodiments, the processor comprises a logic-to-physical address translation (or virtual-to-physical address translation, in virtual memory systems; we will refer to both as "logical") and the exception areas are defined in the logical address space. In other embodiments the exception areas are defined in the physical address space. In an embodiment, there may be a single segment of memory that is defined as an exception area, and in another embodiment, there may be a plurality of exception areas, in the logical and/or the physical address spaces. FIG. 2 is a block diagram 200 that schematically illustrates conditional fence in a processing system wherein the exception memory areas are defined in the logical address space, in accordance with an embodiment of the present invention. According to the example embodiment illustrated in FIG. 2, Processor 102 comprises a Memory Management Unit (MMU) 202. The MMU is configured to translate logical addresses to physical addresses. Typically, the translation maps segments of logical addresses (e.g., 4096-byte segments) to segments in the physical memory, whereas the intra-segment address, e.g., bits 11:0 of the address, are unchanged by the MMU. The translation is done using tables that are typically stored in the MMU or in an attached memory that the MMU accesses.

MMU 202 is configured to indicate that a logical address is in the exception area. For example, the logical to physical translation tables of MMU 202 may comprise an Exception Segment bit; when the processor issues a logical address in an exception segment, the MMU will indicate Exception-Area to the MACC. The MACC will then allow immediate memory access to the processor, irrespective of whether pre-conditional-fence memory accesses have been completed.

Figure 3:
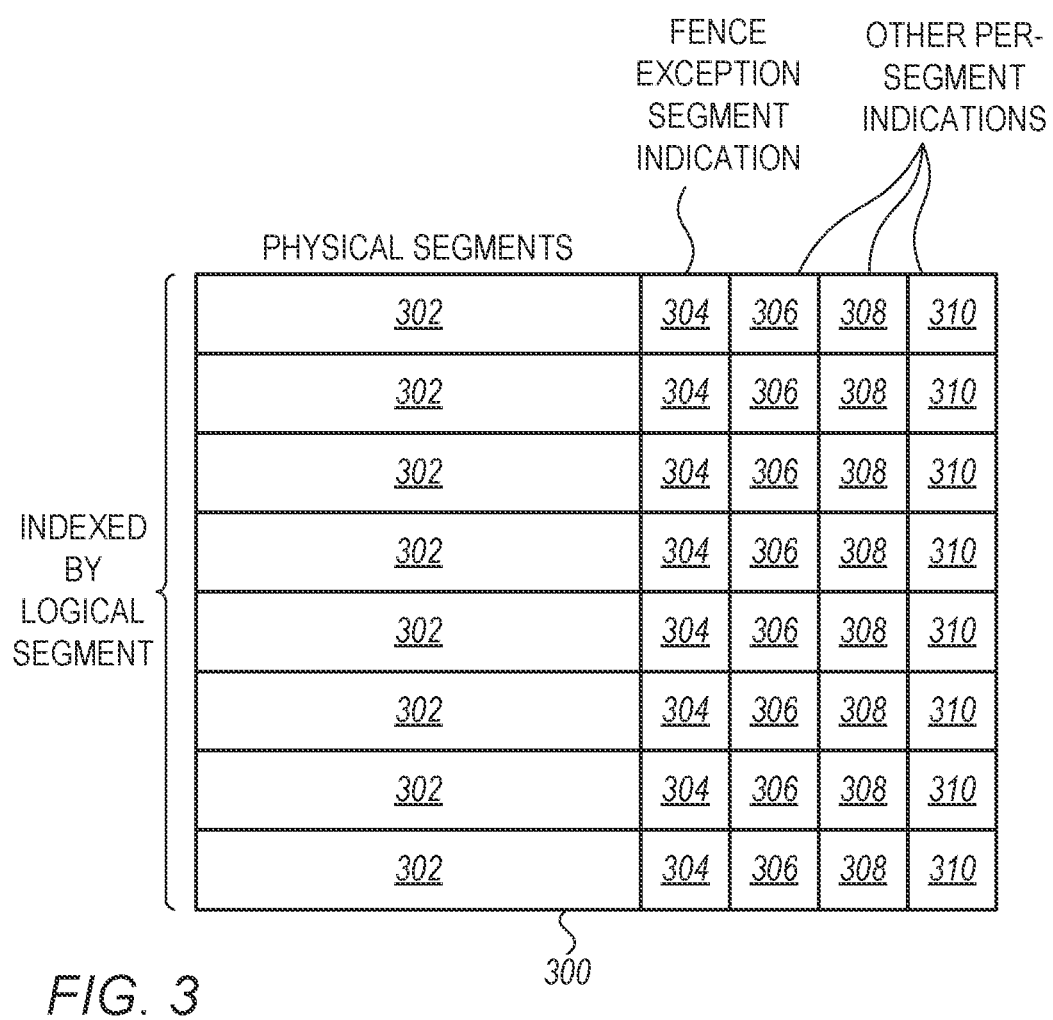
FIG. 3 is a block diagram that schematically illustrates the contents of a translation table in a Memory Management Unit (MMU), in accordance with an embodiment of the present invention.

FIG. 3 is a block diagram that schematically illustrates the contents of a translation table 300 in an MMU, in accordance with an embodiment of the present invention. To access a logical address in the memory, the processor sends a logical segment number (e.g., the 20 most-significant-bits of the logical address) to the MMU (e.g., MMU 202, FIG. 2).

Translation table 300 comprises, for each logical segment number, a physical segment 302, which stores the physical segment that corresponds to the logical segment, a Fence Exception Segment indication 304, which indicates whether the segment is part of a conditional fence exception area, and other indicators 306, 308 and 310 (which may be used, for example, for access rights indication). The MMU sends the contents of the Fence Exception Segment indication corresponding to the logical segment address that the processor issues, to MACC 106.

As would be appreciated, the structure of translation table 300 illustrated in FIG. 3 is an example structure that is cited by way of example. Other suitable MMU tables may be used in alternative embodiments. For example, in some embodiments, there is a hierarchy of translation tables; in embodiments, part or all of tables 300 may be cached into a cache memory within the MMU. In an embodiment, several exception indication bits may be used, e.g., a load-exception indication, a store exception indication and an execute exception indication bit. In another embodiment, exception indication is a combination of other indication bits.

Figure 4:
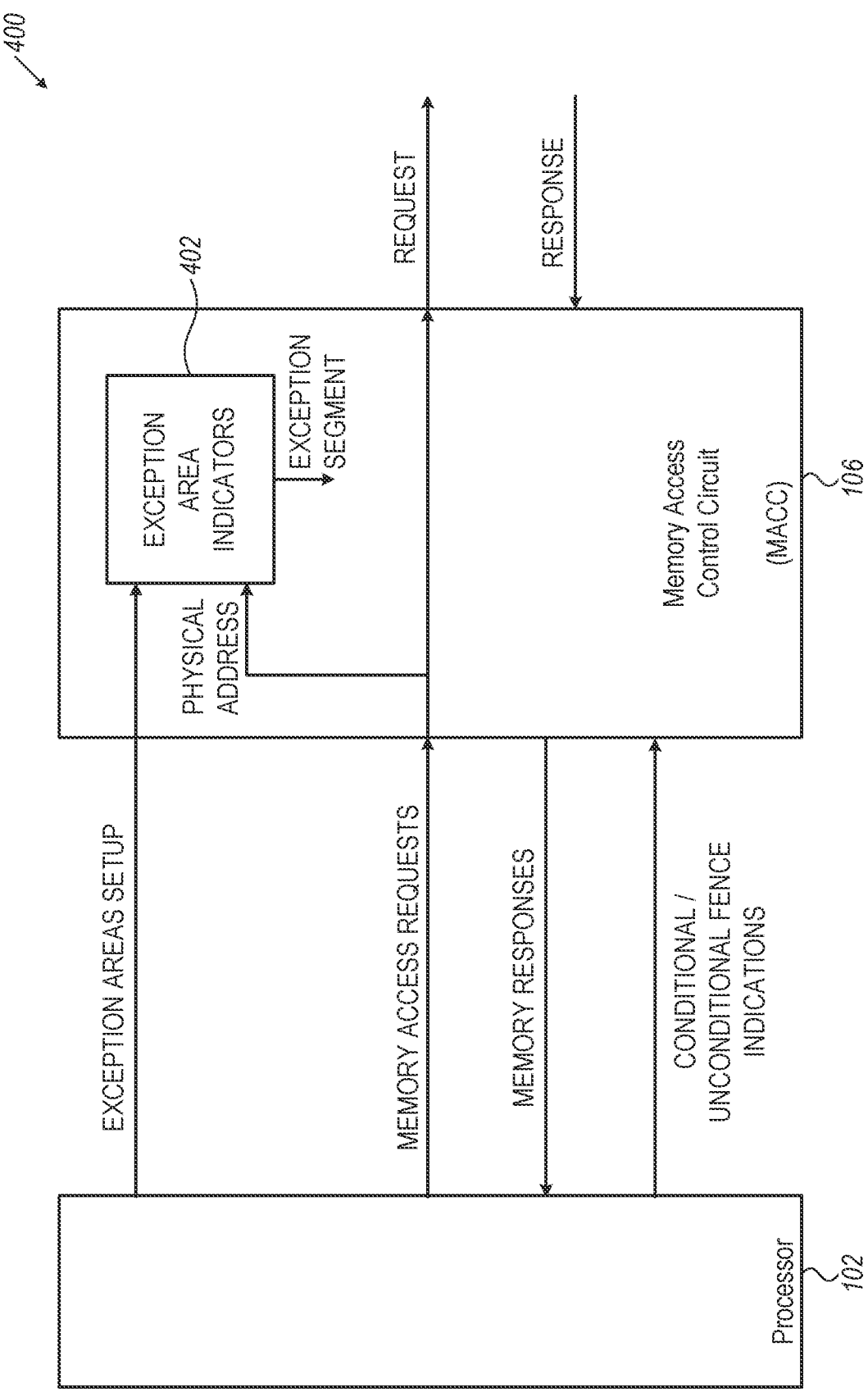
FIG. 4 is a block diagram that schematically illustrates conditional fence in a processing system wherein the exception memory areas are defined in the physical address space, in accordance with an embodiment of the present invention.

FIG. 4 is a block diagram that schematically illustrates conditional fence in a processing system wherein the exception memory areas are defined in the physical address space, in accordance with an embodiment of the present invention. According to the example embodiment illustrated in FIG. 4, MACC 106 comprises an Exception Area Indicator Circuit (EAIC) 402. During an initial Setup phase, Processor 102 sends indications of the conditional fence exception areas, in terms of physical address, to EAIC 402. The EAIC is configured to store indications of the exception areas and, when the Processor sends memory access requests, to compare the physical address of the request to the stored memory exception areas indications and indicate if the physical address points to an exception area.

In some embodiments, the exception areas may be defined by a group of start-address/stop-address pointer pairs, indicating the boundaries of each memory exception segment; the EAIC stores the start and stop addresses in registers, and compares the physical address of subsequent memory accesses to the boundaries, to find if the physical address is between a start address and a stop address of one (or more) of the exception segments.

In other embodiments, the exception areas are one or more segments in physical memory; the EAIC is configured to store the list of exception segments, e.g., in a content-addressable memory (CAM). When the processor issues a memory access request, the EAIC simultaneously compares the segment number part of the physical address in the request to the exception segment numbers stored in the CAM. In case of a Match, the EAIC indicates that the current memory access request is within the exception area.

As would be appreciated, the structure of MACC 106, illustrated in FIGS. 2 and 4 and described hereinabove, are example structures that are defined by way of example. Other suitable structures may be used in alternative embodiments; for example, in an embodiment, a CAM may be used in embodiments wherein the exception area is defined in the logical address space. In another embodiment, exception areas may be defined in the logical and in the physical address spaces. In some embodiments, groups of exception areas may be turned off and on by software control and, in yet other embodiments, there is a single exception area.

Types of Conditional Fence Indications

The embodiments discussed herein describe a conditional fence that allows out of order execution of any memory accesses to exception areas. Embodiments according to the present invention, however, may limit accesses to the exception areas. In some embodiments, a Read-Conditional-Fence may be defined, wherein out-of-orders accesses to exception areas are allowed only for read-type memory accesses; similarly, in other embodiments, Write-Conditional-Fence and Execute-Conditional-Fence instructions may be defined, allowing out-of-order access to exception areas only for a Write or for an Execute access, respectively.

In some other embodiments, combinations of the conditional fences described above may be used, e.g., a Read-Execute conditional fence, which allows out-of-order access to exception areas for Read and Execute memory accesses. In embodiments, more fields of MMU 202 (FIG. 2) may be used to differentiate between the three types of conditional fences. In other embodiments, EAIC 402 (FIG. 4) is configured to store, in each one of a plurality of segment exception areas, exception type indicators (e.g., Read, Write and/or Execute), and to indicate, for each memory access cycle, if the address is in a Read-Exception area, a Write-Exception Area, an Execute-Exception area, or none.

As would be appreciated, in various embodiments various combinations of the conditional fence and the associated exception areas may be used; for example, in an embodiment, a mix of exception areas may be used, wherein some of the exception areas are defined in the logical address space and others in the physical address space.

Example Program

In the descriptions that follow, we will refer to a multi-processing example wherein a source processor (or a process, or a thread) prepares data for a target processor and indicates when the data is ready by writing a flag in memory. It is imperative that the value of the flag that the target processor reads will not precede the value of the data. This is guaranteed in a strict order execution; however, in relaxed-order execution, if, for example, the flag is written to a local memory and the data to a remote memory, the order may be reversed. (The order may also be reversed, if for any reason, a data read cycle is delayed.)

This is typically solved by the addition of a fence instruction, as shown in the following example sequence:
1: store data in remote memory
2: store flag in local memory
3: read flag from local memory
4: fence (non-conditional)
5: (if the flag is set): read data from local memory
6 to 11: Do calculations.

(While steps 1 and 2 are executed by the producer's processor, steps 3 through 6 are executed by the consumer's processor. It should be noted that, in the producer's software, step 1 (store-data) should precede step 2 (store flag). This may be guaranteed, for example, using a fence in the producer software.)

However, the unconditional fence may also block the reading of data which is known to be coherent. For example, a local stack of a process is typically private and is not shared with other processes.

Figure 5B:
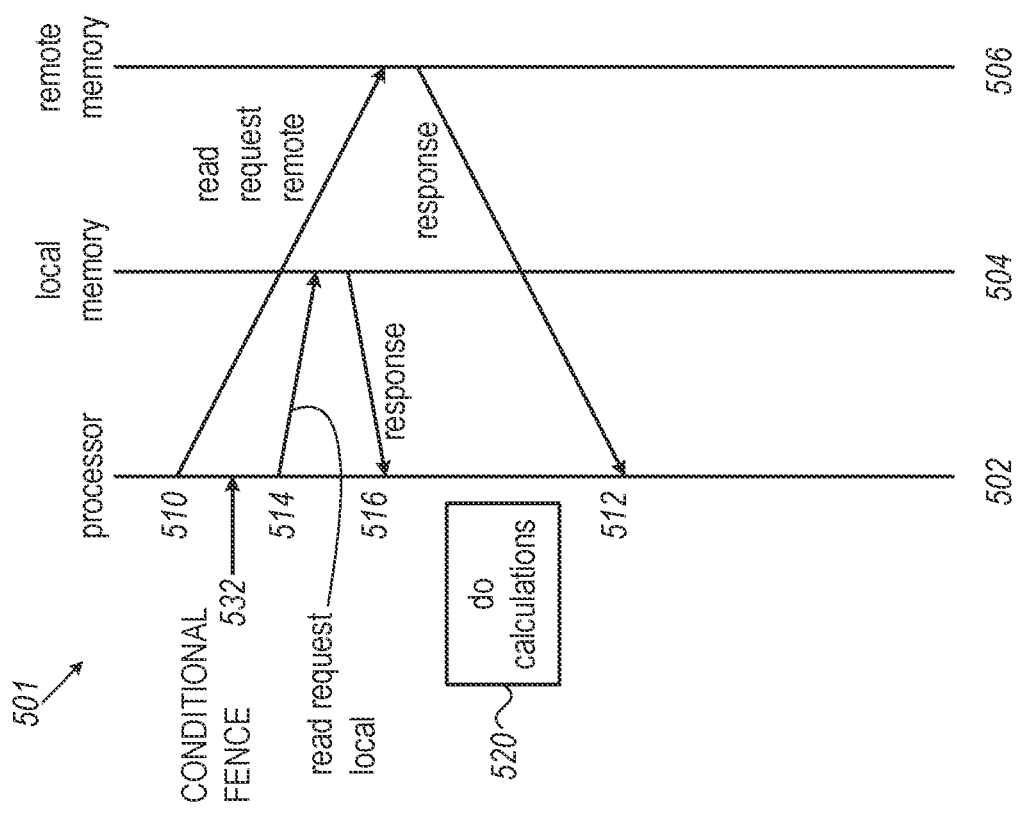
FIG. 5B is a sequence chart that schematically illustrates memory accesses when a conditional fence instruction is used to conditionally force orderly execution, in accordance with an embodiment of the present invention.
Figure 5A:
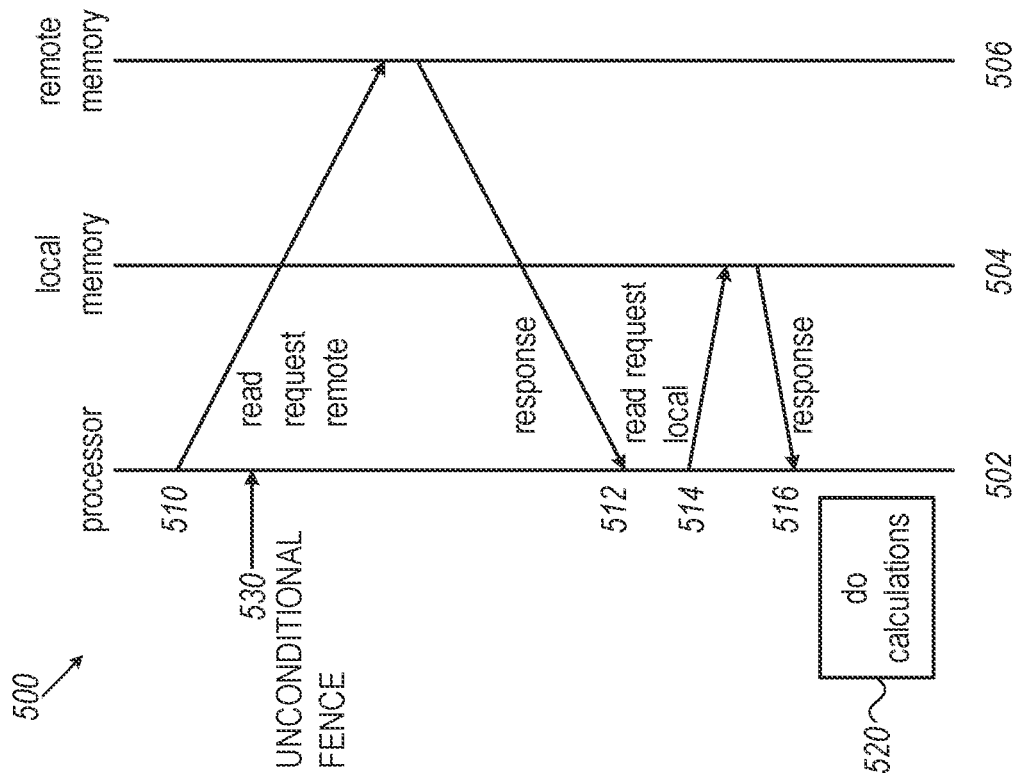
FIG. 5A is a sequence chart that schematically illustrates memory accesses when a non-conditional fence instruction is used to force orderly execution, in accordance with an embodiment of the present invention.

FIG. 5A is a sequence chart 500 that schematically illustrates memory accesses when a non-conditional fence instruction is used to force orderly execution, in accordance with an embodiment of the present invention. The sequence chart illustrates transactions between a consumer's processor 502, a local memory 504 and a remote memory 506. The access times of the local memory are considerably shorter than those of the remote memory. For clarity, we skip the first two instructions (store data and store flag) of the example above and start the sequence chart at the next instruction—a Read-Request-Remote transaction 510, wherein the processor sends a read request to the remote memory. The remote memory returns the read data in a Response transaction 512. The processor then, in a local-memory-request transaction 514, requests reading data from local memory, which sends the data in a Response transaction 516, At this point, the processor enters the Do Calculations group of instructions 520.

According to the example embodiment illustrated in FIG. 5A, the processor issues an Unconditional Fence instruction 530 after sending the remote read request 510. This will assure that read-request 514 and the corresponding response 516 will not be executed before remote the read-request 510 had been completed (e.g., that the processor has received response 512 from local memory).

It should be noted that in this case, as the read data in transactions 514, 516 is stack data that is not shared, the Fence instruction degrades the performance. A fence instruction is needed, however, if the read data is private in some cases and shared in others (for example, if the same function is called in two different occasions).

In an embodiment, a conditional fence may be used in this case, wherein the stack area is pre-defined as an exception area (e.g., by an MMU).

FIG. 5B is a sequence chart 501 that schematically illustrates memory accesses when a conditional fence instruction is used to conditionally force orderly execution, in accordance with an embodiment of the present invention. The same transactions that were described with reference to FIG. 5A are used here, except that a conditional fence instruction 532 is used in lieu of unconditional fence instruction 530 of FIG. 5A.

Since the stack is predefined as an exception area, read-request local 514, response 516 and calculations 520 are executed before the processor receives response 512 from the remote memory, saving a considerable amount of time.

The example sequence illustrated in FIGS. 5A, 5B are cited for the sake of conceptual clarity, and may not include some essential elements (e.g., the preloading of the flag in local memory and data in global memory). Any other suitable sequences may be used in alternative embodiments.

Cache Memory Considerations

When a cache memory is accessed, following a fence instruction, the penalty may be heavy because the cache entry must be invalidated. For example, if the contents of address A are stored in the cache, and A is accessed after a non-conditional fence, the contents of A in the cache may have been written in the cache prior to the fence instruction and, hence, the cache entry pertaining to address A should be replaced by a new reading from main memory.

In embodiments, cache entries that correspond to exception areas do not have to be invalidated, considerably saving execution time. In some embodiment, a bit is added to all cache entries, and, when the entry is first written in the cache, the MACC marks if the entry is part of a main memory exception area. Thus, cache entries that store replica of exception areas in memory are not invalidated.

Figure 6:
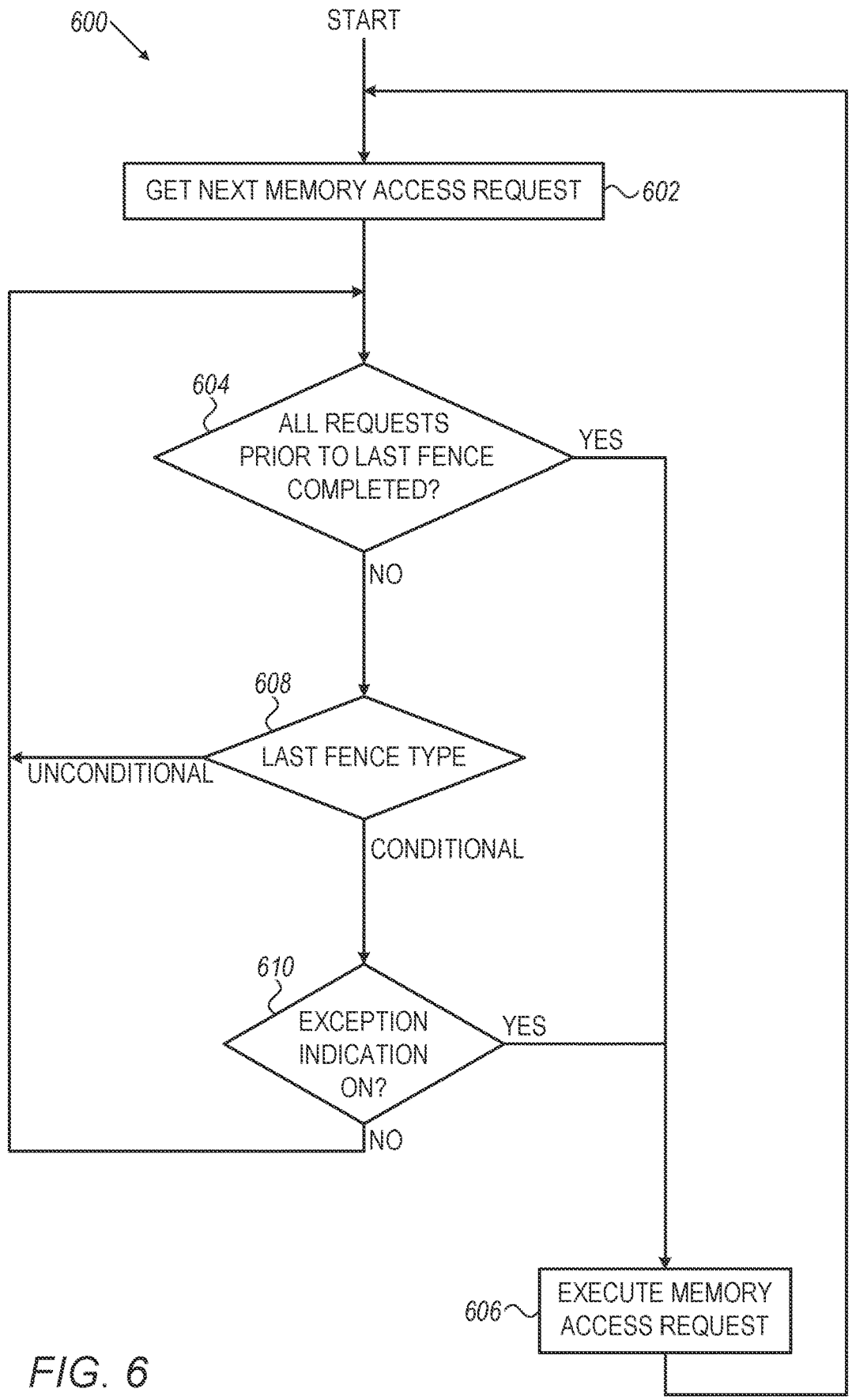
FIG. 6 is a flowchart that schematically illustrates a method for conditional fence in a multiprocessor system, in accordance with an embodiment of the present invention.

FIG. 6 is a flowchart 600 that schematically illustrates a method for conditional fence in a multiprocessor system, in accordance with an embodiment of the present invention. The flowchart is executed by a MACC (e.g., MACC 106, FIG. 1), which is coupled to a processor (e.g., processor 102, FIG. 1).

It is assumed that the processor has preset in an MMU (e.g., MMU 202, FIG. 2) or in an EAIC (e.g., EAIC 402, FIG. 4) one or more exception areas within the memory, and that the MMU or the EAIC detects and signals memory accesses to the exception areas.

The flowchart starts at a Get-Next-Access step 602, wherein the MACC receives a memory access request from the processor. Next, at a Check-Previous-Requests-Done step 604, the MACC checks if all requests prior to the last fence instruction have been completed. If so, the MACC enters an Execute Access step 606, executes the memory access request, and then reenters step 602, to handle the next memory access.

If, in step 604, not all requests have been completed, the MACC enters a Check-Last-Fence step 608 and checks the type of the last fence instruction. If the last fence instruction was unconditional fence, the MACC will not execute the memory access and, instead, will reenter step 604, to wait until all pre-fence accesses have been completed.

If, in step 608, the last fence type was a conditional step, the MACC will enter a Check Exception Indication step 610, and check if the exception area indication is set (e.g., by the MMU). If the exception indication is not set, the MACC will not execute the memory access and, instead, will reenter step 604, to wait until all pre-fence accesses have been completed.

If, however, in step 610, the exception area indication is set, the MACC does not have to wait for all pre-fence accesses to complete; instead, the MACC enters step 606 and executes the memory access.

Thus, according to the example flowchart illustrated in FIG. 6, conditional and unconditional fence instructions may be used, allowing the processor to save considerable processing time on accesses to non-shared areas when conditional fences are used.

As would be appreciated, the structure of flowchart 600 illustrated in FIG. 6 and described hereinabove is an example that is cited for the sake of clarity. Flowcharts according to the present invention are not limited to the structure shown in FIG. 6; any other suitable flowcharts may be used in alternative embodiments. For example, in an embodiment, the MACC checks for various types of conditional fences, e.g., load/store and execute conditional fences. In some embodiments, some of the steps of flowchart 600 may be executed in a different order, and in yet another embodiment some of the steps may be merged.

The configurations of processor system 100, processor 102, MACC 106, MMU 202 and EAIC 402, MMU table 300, sequence charts 500, 501 and flowchart 600, illustrated in FIGS. 1 through 6 and described hereinabove, are example configurations, tables, sequence charts and flowcharts that are shown purely for the sake of conceptual clarity. Any other suitable configurations, sequence charts and flowcharts can be used in alternative embodiments. The different sub-units of processor 102 and MACC 106 may be implemented using suitable hardware, such as in one or more Application-Specific Integrated Circuits (ASICs) or Field-Programmable Gate Arrays (FPGAs), using software, using hardware, or using a combination of hardware and software elements.

Processor 102 (FIG. 1) may comprise a general-purpose processor, which is programmed in software to carry out the functions described herein. The software may be downloaded to the processor in electronic form, over a network or from a host, for example, or it may, alternatively or additionally, be provided and/or stored on non-transitory tangible media, such as magnetic, optical, or electronic memory.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus, comprising:
   a processor, configured to designate a memory region in a memory, and to issue (i) memory-access commands for accessing the memory and (ii) a conditional-fence command associated with the designated memory region; and
   Memory-Access Control Circuitry (MACC), which is configured, in response to a memory-access command, to:
      check if all memory-access commands accessing the memory prior to a last fence instruction have been completed;
      check whether the memory-access command accesses an address in the designated memory region;
      execute the memory-access command immediately, if all memory-access commands accessing the memory, prior to the last fence instruction have been completed, or if the memory-access command accesses an address in the designated memory region; and
      defer execution of the memory-access command if not all memory-access commands prior to the last fence instruction have been completed, and the memory-access command accesses an address not in the designated memory region.

2. The apparatus according to claim 1, wherein the processor is configured to run one or more threads, and to include in the designated memory region only private intra-thread storage.

3. The apparatus according to claim 1, wherein the processor is one of multiple processors that share the memory, and wherein the processor is configured to include in the designated memory region only private intra-processor storage.

4. The apparatus according to claim 1,
   wherein the processor is configured to issue the memory-access commands in terms of logical addresses, and the apparatus comprises a memory management unit (MMU) which translates logical addresses to physical addresses, and wherein the MMU is configured to provide with the physical addresses, indicators that identify whether the logical addresses are in the designated memory region, and
   wherein the MACC is configured to check whether the memory-access command accesses an address in the designated memory region based on the indicators from the MMU.

5. The apparatus according to claim 1, wherein the processor is configured to designate the memory region by specifying a designated address range, and wherein the MACC is configured to check whether the memory-access command accesses an address in the designated memory region by comparing the addresses specified in the memory-access commands to the designated address range.

6. The apparatus according to claim 1, wherein the conditional-fence command is restricted to load commands, and wherein the MACC is configured to defer only the load commands that were issued before the conditional-fence command.

7. The apparatus according to claim 1, wherein the conditional-fence command is restricted to store commands, and wherein the MACC is configured to defer only store commands that were issued before the conditional-fence command.

8. The apparatus according to claim 1, wherein the processor is configured to designate the memory region in logical address space, and the MACC is configured to check whether the memory-access command accesses an address in the designated memory region, on logical addresses.

9. The apparatus according to claim 1, wherein the processor is configured to designate the memory region in physical address space, and the MACC is configured to check whether the memory-access command accesses an address in the designated memory region, on physical addresses.

10. The apparatus according to claim 1, wherein the processor is configured to designate a plurality of different memory regions, for corresponding different conditional fence commands referring to different types of access, and wherein the MACC is configured in response to the memory-access command to check whether the memory-access command accesses an address in the designated memory region corresponding to a type of access prescribed by the memory-access command.

11. The apparatus according to claim 1, wherein the MACC is configured to determine whether the last fence instruction was conditional, and to allow immediate execution of the memory-access command even if not all memory-access commands prior to the last fence instruction have been completed, only if the last fence instruction was conditional.

12. A method, comprising:
receiving (i) memory-access commands for accessing a memory and (ii) a conditional-fence command associated with a designated memory region in the memory; and in response to identifying the conditional-fence command, allowing execution of the memory-access commands that access addresses within the designated memory region, even if not all the memory accesses to the memory prior to the conditional-fence command have been completed, and deferring the execution of the memory-access commands that access addresses outside the designated memory region until completion of all the memory-access commands that were issued before the conditional-fence command.

13. The method according to claim 12, wherein the memory-access commands and the conditional-fence command are received from a processor running one or more threads, and wherein the memory region is designated for private intra-thread storage.

14. The method according to claim 12, wherein the memory is shared by multiple processors, and wherein the memory region is designated for private intra-processor storage.

15. The method according to claim 12, wherein the method comprises issuing the memory-access commands in terms of logical addresses, receiving from a memory management unit (MMU) that translates the logical addresses into physical addresses, for the memory-access commands, indications as to whether the translated physical address is in the designated memory region, and
wherein allowing and deferring the execution comprises allowing or deferring the execution of the memory-access commands based on the indications.

16. The method according to claim 12, wherein the memory region is designated by specifying a designated address range, and wherein allowing or deferring the execution comprises comparing the addresses specified in the memory-access commands to the designated address range.

17. The method according to claim 12, wherein the conditional-fence command is restricted to load commands, and wherein allowing or deferring the execution comprises deferring only the load commands that were issued before the conditional-fence command.

18. The method according to claim 12, wherein the conditional-fence command is restricted to store commands, and wherein allowing or deferring the execution comprises deferring only the store commands that were issued before the conditional-fence command.

* * * * *